United States Patent [19]

Coleman et al.

[11] 4,425,002
[45] Jan. 10, 1984

[54] HINGED CAB GUARD

[75] Inventors: Ronald G. Coleman, Thamesford; Kenneth C. Philbrook, Dorchester, both of Canada

[73] Assignee: General Motors Corporation, Detroit, Mich.

[21] Appl. No.: 309,930

[22] Filed: Oct. 9, 1981

[51] Int. Cl.³ .............................................. B60P 1/28
[52] U.S. Cl. .................................. 298/1 R; 280/756; 296/184; 414/914
[58] Field of Search ............ 298/1 R, 17 R; 296/184; 414/914; 280/756, 770

[56] References Cited

U.S. PATENT DOCUMENTS

| 3,462,187 | 8/1969 | Hassler | 296/184 |
| 3,563,401 | 2/1971 | Gandolfo | 280/756 X |
| 3,762,761 | 10/1973 | Erickson | 280/756 X |
| 3,841,698 | 10/1974 | Stammen | 414/914 X |
| 4,116,486 | 9/1978 | Duttarer | 298/1 R X |

Primary Examiner—Leslie J. Paperner
Attorney, Agent, or Firm—Edward J. Biskup

[57] ABSTRACT

A dump body for a dump truck that includes a hinged cab guard combined with an actuator which serves to pivot the cab guard downwardly relative to the body portion of the dump body so as to allow full raising of the dump body when the dump truck is parked in a garage having a low ceiling.

3 Claims, 5 Drawing Figures

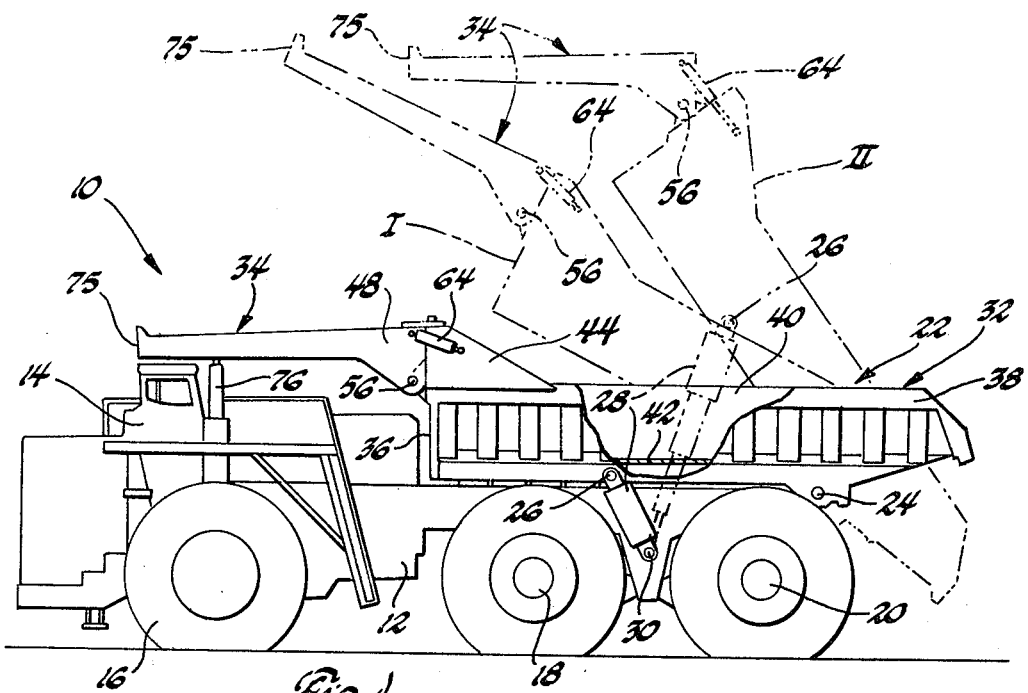
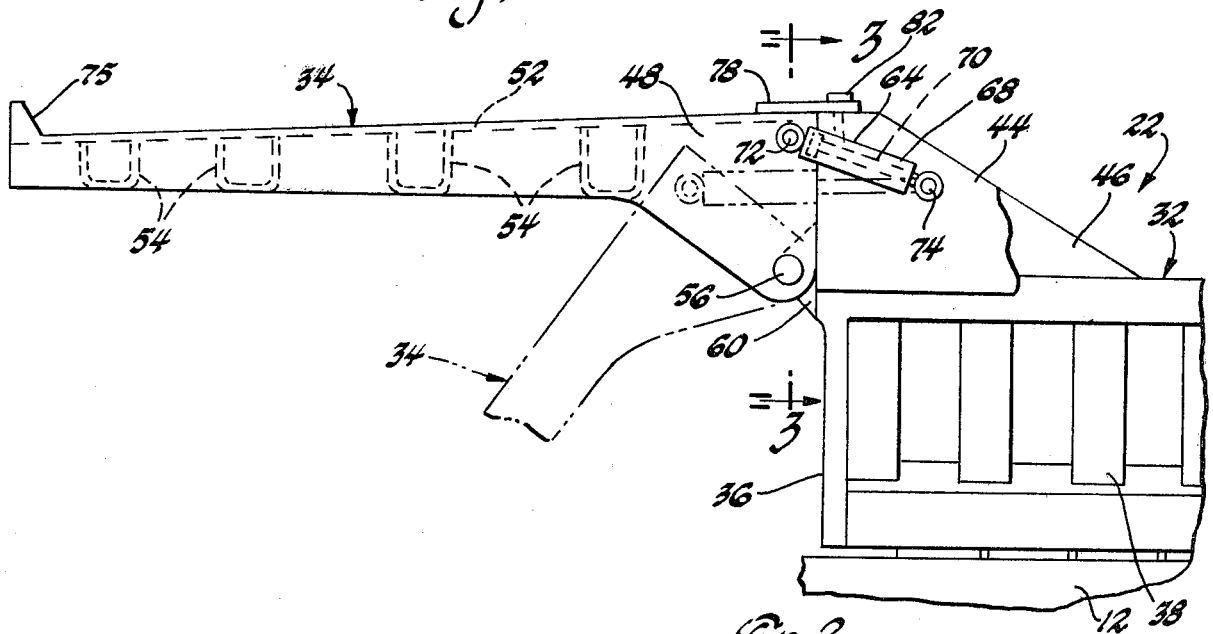
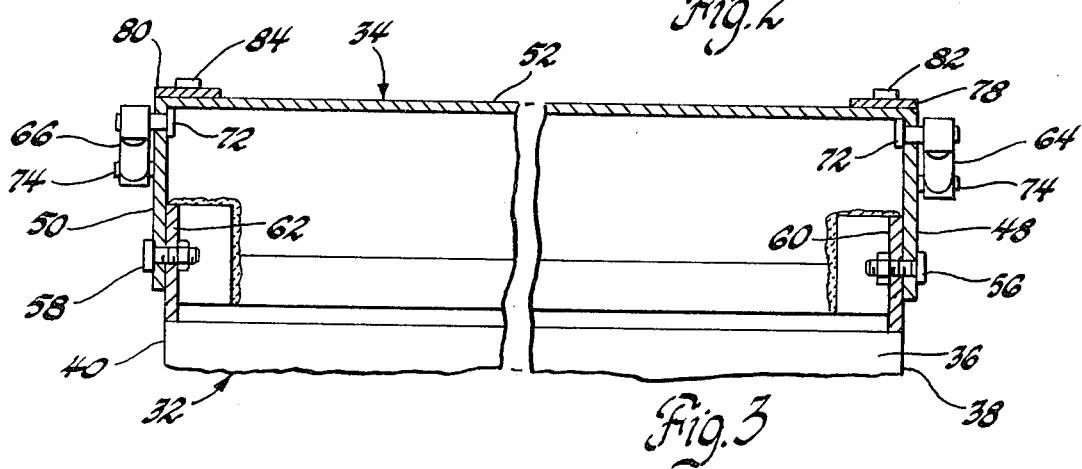

HINGED CAB GUARD

This invention relates to dump trucks and more particularly relates to a dump truck body in which mineral products such as rocks, quarry stones, sand, and similar excavated materials, are supported for transport.

In order to facilitate repair and maintenance, it is frequently necessary that the dump body of the dump truck be raised its full extent about the hinged connection with the truck frame. When the dump truck is in the open field, raising of the dump body to the fully raised position presents no problem. However, when the dump truck is within a garage or similar facility, a problem could be encountered if the ground-to-ceiling height is significantly less than the overall longitudinal length of the body portion of the dump body plus the cab guard.

Accordingly, the objects of the present invention are: to provide a new and improved dump body for a dump truck that includes a cab guard connected to the body portion of the dump body and combined with an actuator which serves to lower the front end of the cab guard relative to the body portion so as to allow the dump body to be fully raised when the dump truck is located in a facility having a limited ceiling height; to provide a new and improved dump body for a dump truck having a cab guard which is pivotally connected at its rear end to the body portion of the dump body and is normally maintained in a plane substantially parallel to the plane of the floor of the body portion of the dump body but can be pivoted downwardly relative to the body portion so as to allow full raising of the dump body when the dump truck is parked within a garage having a low ceiling; and to provide a new and improved dump body for a dump truck having a hinged cab guard which is normally locked to the body portion of the dump body and is adapted to be unlocked so that the front end of the cab guard can be lowered relative to the body portion of the dump body.

The above objects and others are achieved in accordance with the present invention by a dump body for a dump truck which has a longitudinally extending frame, one end of which is provided with an operator's cab and the other end of which is provided with a pivotal connection that supports the dump body for movement about a first horizontal axis from a lowered-carry position to a raised-dump position. The dump body includes a body portion which serves as a receptacle for the materials to be transported and is defined by a front wall, a pair of side walls, and a floor section. A cab guard is hinged to and extends forwardly from the front wall of the body portion above the operator's cab. The cab guard is normally locked to the body portion when the dump body is in the lowered-carry position and is capable of being unlocked therefrom to allow the front free end of the cab guard to pivot downwardly about its hinged connection with the body portion when the dump body is raised so as to avoid any contact with any portion of a low ceiling.

Other objects and advantages of the present invention will be apparent from the following detailed description when taken in conjunction with the accompanying drawings, in which:

FIG. 1 is a side elevational view of a dump truck incorporating a dump body made in accordance with the present invention and that is shown in the lowered-carry position, an intermediate-raised position, and a fully raised-dump position;

FIG. 2 is an enlarged view of the front portion of the dump body showing the hinged connection between the cab guard and the body portion of the dump body;

FIG. 3 is a sectional view taken on line 3—3 of FIG. 2;

Figure 4:
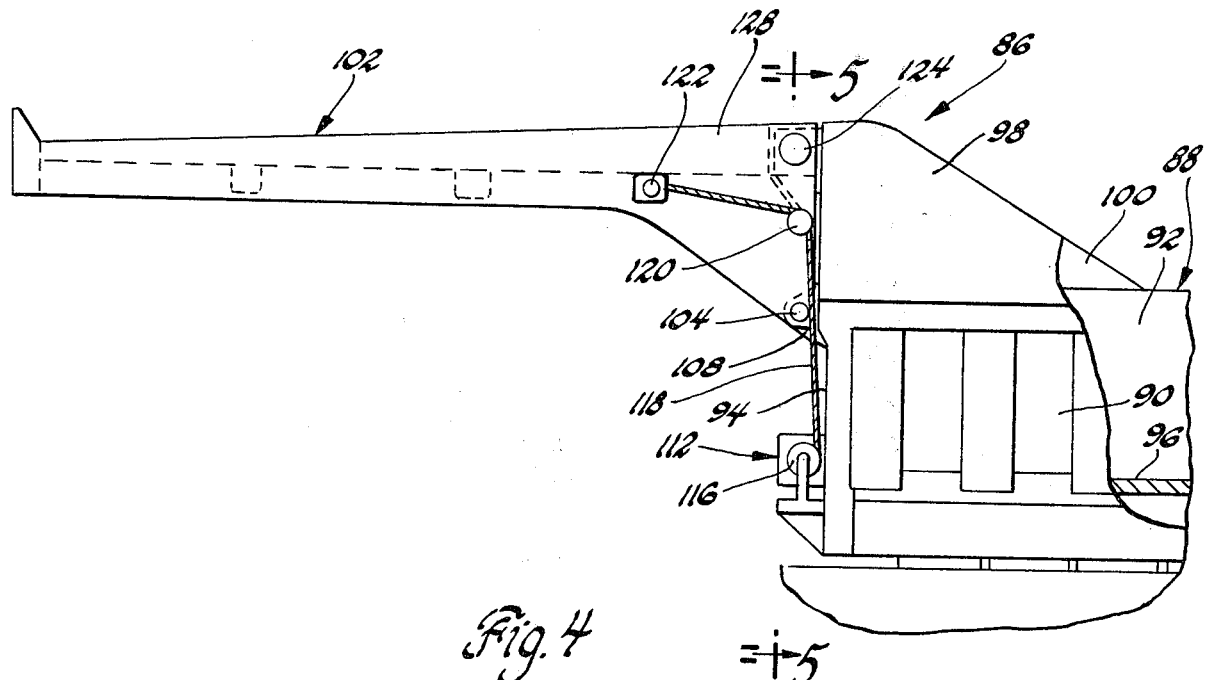
FIG. 4 is a view similar to that of FIG. 2, showing a modified actuating means for controlling movement of the cab guard about its hinged connection with the body portion of the dump body.

Referring to the drawings and more particularly to FIG. 1 thereof, an off-highway rear-dump truck 10 is shown which includes a longitudinally extending frame 12, the forward portion of which supports an operator's cab 14 located above a pair of dirigible front wheels 16. The rear portion of the frame 12 is supported by a tandem suspension with a pair of longitudinally spaced and transversely extending axles 18 and 20 each of which is provided with dual wheels at the opposite ends thereof. A dump body 22, made in accordance with the present invention, is mounted on the frame 12 behind the cab 14 and above the rear axles 18 and 20, and has the lower rear portion thereof connected to the rear end of the frame 12 by the usual pivotal connection 24. The pivotal connection 24 allows the dump body 22 to pivot about a horizontal axis which passes through the center of the pivotal connection 24 and is perpendicular to the longitudinal axis of the dump truck 10. An intermediate portion of the dump body 22—along each side thereof and outboard of the frame 12—is connected by a pivotal connection 26 to one end of a multistage, double-acting, inverted hydraulic cylinder 28. The other end of each hydraulic cylinder 28 is connected to the frame 12 between the axles 18 and 20 by a pivotal connection 30. Thus, when pressurized hydraulic fluid is directed to the hydraulic cylinders 28, the front end of the dump body 22 is pivoted upwardly in a clockwise direction about the pivotal connection 24—from the full line lowered-carry position, to the intermediate-raised position shown in phantom line and identified by the numeral I, and finally to the fully raised-dump position shown in phantom line and identified by the numeral II.

More specifically, the dump body 32 includes the usual body or materials receptacle portion 32 and a hinged cab guard 34 which extends forwardly of and is located above the operator's cab 14. The body portion 32 of the dump body 22 is defined by a front wall 36, a pair of laterally spaced side walls 38 and 40, and a floor section 42—all of which are rigidly interconnected and form a box-like structure for supporting the material loaded therein. In addition, a pair of gusset plates 44 and 46 are provided at the front end of the body portion 32 for rigidly interconnecting the upper portion of the front wall 36 with the side walls 38 and 40.

The cab guard 34 includes a pair of laterally spaced and depending flange members 48 and 50, a top plate 52, and a plurality of U-shaped stiffener members 54 which extend between and are secured to the flange members 48 and 50 and to the top plate 52. The lower rear ends of the flange members 48 and 50 are connected by transversely extending and horizontally aligned pins 56 and 58 to a pair of brackets 60 and 62, respectively, fixed to the front wall 36 of the body portion 32. The upper ends of the flange members 48 and 50 are connected to the body portion 32 by single-acting hydraulic cylinders 64 and 66, each of which includes a cylinder member 68 and a relatively movable piston member 70. Each cylinder member 68 is connected by a pivotal connection 72 to the associated flange member of the cab guard 34; and each piston member 70 is connected by a pivotal connection 74 to the associated gusset plate of the body portion 32. Thus, when the piston rod-ends of the hydraulic cylinders 64 and 66 are vented, the front or free end 75 of the cab guard 34 will pivot downwardly in a counterclockwise direction about the pins 56 and 58, as seen in FIGS. 1 and 2.

It will be noted that where the cab guard has an unusually long overhang—as in the case with cab guard 34, the forward portion thereof can be supported by a pair of laterally spaced stanchions (or similar support structure), one of which is shown in FIG. 1 and identified by the numeral 76. Also, in order to maintain the cab guard 34 in proper orientation relative to the body portion 32—and to alleviate the forces applied to the hydraulic cylinders 64 and 66 when the dump body 22 is raised to dump a load, a pair of straps 78 and 80 are fixed to the rear end of the top plate 52 and respectively connected by removable lockpins 82 and 84 to the body portion 32 (as seen in FIGS. 2 and 3).

It should be apparent from the above description that when the dump body 22 is in the lowered-carry position shown in full lines in FIGS. 1 and 2, the piston rod-ends of the hydraulic cylinders 64 and 66 will be pressurized and, therefore, the cab guard 34 will be maintained in a plane substantially parallel to the plane of the floor section 42 of the body portion 32. Under the circumstances, if the dump truck 10 is parked in a garage or similar structure having a relatively low ceiling, and repair and/or maintenance work necessitates raising of the dump body 22 to the fully raised-position, initially the lockpins 82 and 84 will be manually removed and then the hydraulic cylinders 28 are expanded to raise the dump body 22 clockwise above the pivotal connection 24 to the intermediate position indicated by the numeral I (FIG. 1). The piston rod-end of each hydraulic cylinder 64 and 66 is then vented so as to cause the front or free end 75 of the cab guard 34 to pivot in a counterclockwise direction about the pins 56 and 58 until the cab guard 34 assumes the relative position shown in phantom lines in FIG. 2. Thereafter, the hydraulic cylinders 28 will again be pressurized so that the dump body 22 is moved to the fully raised position indicated by the numeral II (FIG. 1), without the cab guard 34 contacting any part of the ceiling. Afterwards, when it is desired to lower the dump body 22, the hydraulic cylinders 28 are vented so as to allow the dump body 22 to move by gravity to the intermediate raised position I. The piston head ends of the hydraulic cylinders 64 and 66 are then pressurized so as to cause the cab guard 34 to pivot in a clockwise direction about the pins 56 and 58 to return from the phantom line position to the full line position seen in FIG. 2. The dump body 22 would then be lowered to the lowered-carry position shown in full lines in FIG. 1 and the lockpins 82 and 84 would be reinstalled.

It will be noted that pivotal movement of the cab guard 34 can be controlled and coordinated with movement of the body portion 32. Such coordination can be achieved either by a series of independent sequential movements or by proportional synchronous movement. Also, a control system can be provided for sensing the relative positions and for controlling movement of the body portion 32 and the cab guard 34. Such control system can be hydraulic, electrical, mechanical, or any combination thereof—and inasmuch as the hinged cab guard 34 is intended primarily for use in confined structures and not intended for use in the areas of normal dumping operations, the control system would have a built-in lockout provision.

Figure 5:
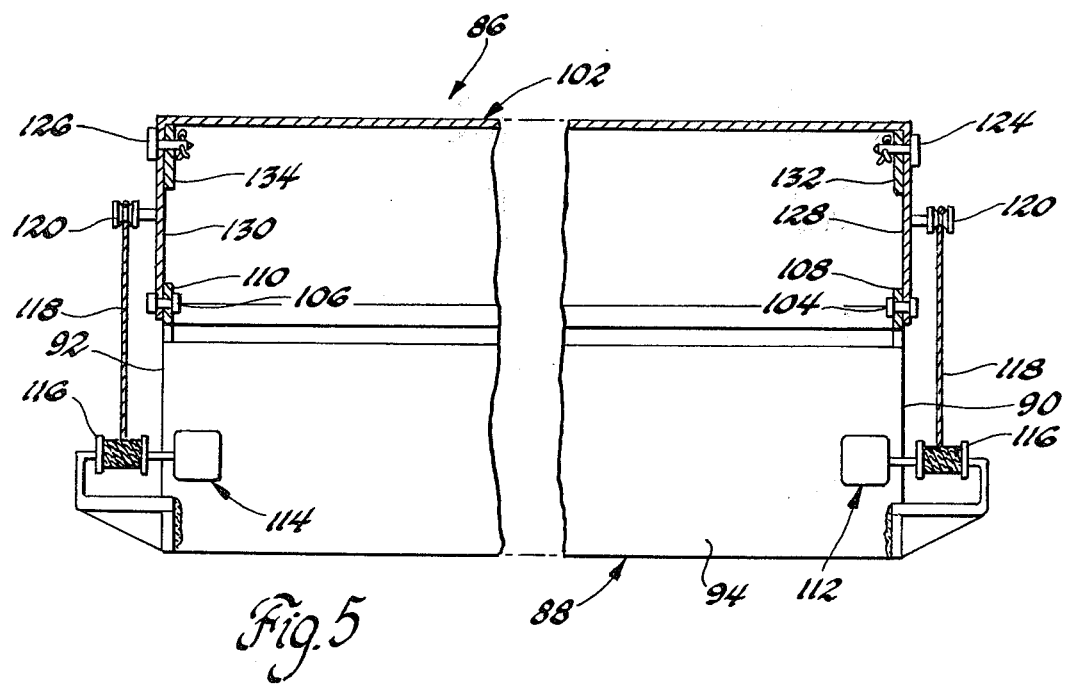
FIG. 5 is a sectional view taken on line 5—5 of FIG. 4.

FIGS. 4 and 5 show the front end of a dump body 86 which is substantially identical in construction to the dump body 22 shown in FIGS. 1, 2, and 3. In this regard, it will be noted that the dump body 86 has a body portion 88 defined by a pair of side walls 90 and 92, a front wall 94, and a floor section 96. Each side wall 90 and 92 has a gusset plate 98 and 100 fixed thereto, and the front end of the body portion 88 carries a cab guard 102 for pivotal movement about a pair of transversely extending and horizontally aligned pins 104 and 106 carried respectively by brackets 108 and 110 secured to the front wall 94 of the body portion 88. Thus, the cab guard 102 can be pivoted downwardly relative to the body portion 88 in the same manner as the cab guard 34 of the dump body 22 shown in FIGS. 1, 2, and 3. In this case, however, rather than utilizing hydraulic cylinders for effecting controlled pivotal movement of the cab guard 102, a pair of electric motor-driven winches 112 and 114 are provided, each of which has the usual drum 116 with one end of a cable 118 wound therearound. As best seen in FIG. 4, the other end of the cable 118 extends upwardly from the drum 116, passes around a pulley 120, and is connected to the cab guard 102 at a point 122.

As best seen in FIG. 5, manually removable and insertable locking means are provided for the cab guard 102 which are substantially the same as those previously described for cab guard 34 and shown in FIG. 3. The cab guard 102 is normally locked to the body portion 88 by removable lockpins 124 and 126, extending through respective flange portions 128 and 130 of the cab guard 102, and passing through accommodating apertures (not shown) formed in tongue members 132 and 134 secured to the front wall 94 of the body portion 88.

Thus, when raising of the dump body 86 is necessary within a low-ceiling structure such as that in the previously described example, the lockpins 124 and 126 are first removed; the winches 112 and 114 are activated; and the movements—raising, positioning, and lowering of the dump body 86 and cab guard 102, occur in the same sequence as provided by the actuation of the hydraulic cylinders associated with the dump body 22.

Various modifications and changes may be made in this construction without departing from the spirit of the invention. Such modifications and changes are contemplated by the inventors, and they do not wish to be limited except by the scope of the appended claims.

The embodiments of the invention for which an exclusive property or privilege is claimed are defined as follows:

1. A dump body for a dump truck adapted to be parked with an enclosure having a low ceiling, said dump truck having a frame one end of which is provided with an operator's cab and the other end of which is provided with a pivotal connection that supports said dump body for movement from a lowered-carry position to a raised-dump position; said dump body comprising a body portion defined by a front wall, a pair of side walls, and a floor section; a cab guard extending forwardly from said front wall of said body portion and having a free front end located above said operator's cab; hinge means connecting said cab guard to said body portion adjacent said front wall, said hinge means being positioned on said body portion and on said cab guard so as to allow said free front end of said cab guard to pivot downwardly relative to said body portion towards said operator's cab; and actuator means operatively connected to said cab guard for causing said free front end of said cab guard to pivot downwardly after said dump body is moved from said lowered-carry position to an intermediate raised position so that said free front end of said cab guard is lowered prior to said dump body being raised to said raised-dump position and thereby does not contact any portion of said ceiling.

2. A dump body for a dump truck adapted to be parked within an enclosure having a low ceiling, said dump truck having a longitudinally extending frame one end of which is provided with an operator's cab and the other end of which is provided with a pivotal connection that supports said dump body for movement about a first horizontal axis from a lowered-carry position to a raised-dump position; said dump body comprising a body portion defined by a front wall, a pair of side walls, and a floor section; a cab guard extending forwardly from said front wall of said body portion and having a free front end located above said operator's cab; hinge means connecting said cab guard to said body portion adjacent said front wall, said hinge means being positioned on said body portion and on said cab guard to pivot downwardly relative to said body portion towards said operator's cab about a second horizontal axis which is parallel to said first horizontal axis; a winch having a cable connected between said cab guard and said body portion for causing said free front end of said cab guard to pivot downwardly under control about said second horizontal axis after said dump body is moved about said first horizontal axis from said lowered-carry position to an intermediate-raised position so that said free front end of said cab guard is lowered prior to said dump body being raised to said raised-dump position and thereby does not contact any portion of said ceiling.

3. A dump body for a dump truck adapted to be parked within an enclosure having a low ceiling, said dump truck having a frame one end of which is provided with an operator's cab and the other end of which is provided with a pivotal connection that supports said dump body for movement from a lowered-carry position to a raised-dump position; said dump body comprising a body portion defined by a front wall, a pair of side walls, and a floor section; a cab guard extending forwardly from said front wall of said body portion and having a free front end located above said operator's cab; hinge means connecting a lower portion of said cab guard to said body portion adjacent said front wall, said hinge means being positioned on said body portion and on said cab guard so as to allow said free front end of said cab guard to pivot downwardly relative to said body portion towards said operator's cab; lock means for maintaining the upper portion of said cab guard connected to said body portion; and actuator means in the form of a hydraulic cylinder connected between said cab guard and said body portion for causing said free front end of said cab guard to pivot downwardly under control after said lock means is released and said dump body is moved from said lowered-carry position to an intermediate-raised position so that said free front end of said cab guard is lowered prior to said dump body being raised to said raised-dump position and thereby does not contact any portion of said ceiling.

* * * * *